United States Patent
Morgan et al.

(10) Patent No.: US 7,550,412 B2
(45) Date of Patent: Jun. 23, 2009

(54) COMPOSITIONS AND METHODS FOR PRODUCING GUAR GUM AND FOR USING THE GUAR GUM IN TREATING A SUBTERRANEAN FORMATION

(75) Inventors: Ronnie G. Morgan, Waurika, OK (US); Lewis R. Norman, Duncan, OK (US); Rickey L. Morgan, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 666 days.

(21) Appl. No.: 11/289,956

(22) Filed: Nov. 30, 2005

(65) Prior Publication Data

US 2007/0123432 A1     May 31, 2007

(51) Int. Cl.
    *C09K 8/68*     (2006.01)
    *C08B 37/00*     (2006.01)

(52) U.S. Cl. .................. 507/209; 536/114; 426/629

(58) Field of Classification Search ............... 507/209; 536/114; 426/629
See application file for complete search history.

(56) References Cited

U.S. PATENT DOCUMENTS

| | | | | |
|---|---|---|---|---|
| 2,891,050 | A | * | 6/1959 | Elverum et al. ............ 536/114 |
| 3,080,355 | A | * | 3/1963 | Muller ....................... 536/114 |
| 3,132,681 | A | * | 5/1964 | Keen et al. ................. 426/483 |
| 3,455,899 | A | | 7/1969 | Keen ......................... 260/209 |
| 3,543,823 | A | * | 12/1970 | Keen ......................... 800/298 |
| 4,031,306 | A | | 6/1977 | DeMartino et al. ......... 536/114 |
| 4,269,975 | A | | 5/1981 | Rutenberg et al. ......... 536/114 |
| 4,659,811 | A | * | 4/1987 | Wu ............................ 536/114 |
| 5,489,674 | A | | 2/1996 | Yeh ........................... 356/114 |
| 6,048,563 | A | | 4/2000 | Swartz et al. ............... 426/573 |
| 6,063,402 | A | * | 5/2000 | Gebert et al. ............... 424/464 |
| 6,737,386 | B1 | | 5/2004 | Moorhouse et al. ........ 507/211 |
| 2002/0052298 | A1 | | 5/2002 | Chowdhary et al. ........ 507/209 |
| 2004/0161524 | A1 | * | 8/2004 | Sakai et al. ................. 426/655 |

OTHER PUBLICATIONS

PVPN 200400235, dated Jun. 3, 2004, 10 pages.*

(Continued)

*Primary Examiner*—Timothy J. Kugel
*Assistant Examiner*—Alicia M Toscano
(74) *Attorney, Agent, or Firm*—Robert A. Kent; Booth, Albanesi & Schroeder, LLC

(57) ABSTRACT

The invention provides a method for producing guar gum, the method comprising the steps of: (a) sizing husk from guar seed into larger pieces and smaller pieces, (b) washing the larger pieces, (c) soaking the larger pieces, and (d) flaking the larger pieces to obtain guar gum. The invention also provides a method for processing undehusked guar splits, the method comprising the steps of: (a) dehusking undehusked guar splits to obtain dehusked guar splits and husk, and (b) sizing the husk into larger pieces and smaller pieces. The invention further provides a method for treating a subterranean formation penetrated by a wellbore, wherein the method comprises the steps of: (a) sizing husk from guar seed into larger pieces and smaller pieces; (b) washing the larger pieces; (c) soaking the larger pieces; (d) flaking the larger pieces to obtain guar gum flakes; (e) grinding the guar gum flakes to obtain guar gum powder; (f) forming a well treatment fluid, wherein the well treatment fluid comprises an aqueous fluid and the guar gum powder; and (g) introducing the well treatment fluid through the wellbore into the subterranean formation.

23 Claims, 5 Drawing Sheets

OTHER PUBLICATIONS

PVPO certificate for PVPN 200400235 issued Mar. 25, 2005, 1 page.*

International Search Report and Written Opinion for Application No. PCT/GB2007/003813.

* cited by examiner

COMPOSITIONS AND METHODS FOR PRODUCING GUAR GUM AND FOR USING THE GUAR GUM IN TREATING A SUBTERRANEAN FORMATION

CROSS-REFERENCE TO RELATED APPLICATIONS

Not applicable

STATEMENT REGARDING FEDERALLY SPONSORED RESEARCH OR DEVELOPMENT

Not applicable

REFERENCE TO MICROFICHE APPENDIX

Not applicable

FIELD OF THE INVENTION

The invention generally relates to compositions and methods producing guar gum and compositions and methods for using the guar gum for treating a subterranean formation.

BACKGROUND OF THE INVENTION

Guar gum is widely used in the oil and gas industry in various well treatment procedures to increase production of oil and gas from a well. The general objective is, of course, to obtain oil and gas as a valuable commodity. Oil and gas is used in the production of products such as refined fuels and oils, and it is used also as the raw material for many types of plastics and chemicals.

Typically, oil and gas is found accumulated and trapped in various subterranean formations. The formations are considered to be subterranean regardless of whether they are under land or under water. For example, an oil and gas bearing subterranean formation may be offshore under a sea floor. To reach an oil and gas bearing subterranean formation, it is almost always necessary to drill a well many thousands of feet into the earth.

Drilling a well to reach one or more oil and gas bearing subterranean formations is merely one of the many challenges to bringing the oil and gas up to the surface. Another challenge is extracting the oil and gas from the subterranean formation. For example, the oil and gas may be trapped in the tiny pores in the rock of the subterranean formation, and the interconnections between the pores may be so few or poorly interconnected that it is difficult for the oil and gas to flow through the rock and into the well. Sometimes the formation is damaged by water being introduced into the formation by the mere drilling of the well into the formation, or by the water present in the drilling fluid used to drill the wellbore. Sometimes the formation is damaged by the migration of certain types of hydrocarbon, such as waxes. Sometimes the formation is damaged by the movement of tiny particles called "fines" that plug the interconnections between the pores in the rock. Thus, the permeability of the subterranean formation to the fluid flow of oil and gas is often very low. This presents another challenge to increase the flow of oil and gas through the rock of the subterranean formation and into the well. In the oil and gas industry, treatments performed to restore or enhance the productivity of a formation are referred to as "stimulation."

Of the various stimulation techniques, one of the most common and widely accepted is hydraulic fracturing. In general, hydraulic fracturing involves injecting a fracturing fluid through the wellbore and into an oil and gas bearing subterranean formation at a sufficiently high rate of fluid flow and at a sufficiently high pressure to initiate and extend one or more fractures in the formation. To conduct hydraulic pressure through the wellbore, the fracturing fluid must be substantially incompressible. In addition, because of the large quantities of fracturing fluid required, the fracturing fluid is preferably based on readily-available and plentiful fluid. Thus, the typical fracturing fluid is based on water.

The fracturing fluid is injected through the wellbore at such a high flow rate and under such high pressure that the rock of the subterranean formation that is subjected to the hydraulic treatment cracks apart or fractures under the strain. When the formation fractures, the pressure is relieved as the fracturing fluid starts to move quickly through the fracture and out into the formation. The theoretical objective of forming such a fracture in the rock of the formation is to create a large surface area of the faces of the fracture. The large surface area allows oil and gas to flow from the rock of the subterranean formation into the facture, which provides an easy path for the oil and gas to easily flow into the well.

However, once the high pressure is relieved suddenly by the escape of the fracturing fluid through the created fracture and out further into the subterranean formation, the fracture has a tendency to be squeezed closed by the natural pressures on the rock within the deep subterranean formation. To keep the fracture open, some kind of material must be placed in the fracture to prop the faces of the fracture apart.

The desirable material for the purpose of propping the fracture apart must meet several criteria. For example, the material must have a sufficient strength not to be entirely crushed by the natural forces tending to push the fracture closed. The material must be capable of being fluidized so that it can flow with or immediately following the fracturing fluid. Additionally, the material also must itself not block or seal the fracture. Thus, a typical material used for the purpose of propping open a fracture is sand. Sand, in the aggregate, has a sufficiently high mechanical strength to prop open a fracture in a subterranean formation at typical depths and natural subterranean pressures; it can behave as a fluid in that it can be poured and flow; and the particles, even when tightly compacted, have a network of void spaces between them that can provide high porosity to fluid flow.

While sand is the most commonly used material for the purpose of propping the fracture open, many other materials of the appropriate size range and mechanical strength can be used. In the oil and gas industry, any suitable particulate material that is used for the purpose of propping open a fracture produced by hydraulic fracturing is called a "proppant."

To be able to carry and place a proppant into a newly-created fracture, a fluid must have a sufficient viscosity to suspend and carry the proppant. In a low viscosity fluid, for example, the proppant would have a tendency to simply fall under gravity toward the bottom of the well instead of being carried with the fracturing fluid out into the newly-created fracture. For a fluid to be able to carry the proppant instead of having the proppant fall out of the fluid, the fracturing fluid needs to be made to have a much higher viscosity than that of water. Preferably, the fracturing fluid is a gel, which has a very high viscosity and great capacity for carrying a proppant suspended in the fluid.

Using a water-soluble gum is one of the ways to build viscosity in aqueous systems. Such a gum can be mixed with an aqueous fluid for use in a well to increase fluid viscosity. A sufficient concentration of the gum in an aqueous system can form a linear gel. Furthermore, the gum also can be crosslinked with other compounds, such as borates or various metals, to create a highly viscoelastic fluid, which is highly advantageous to transporting a proppant in a hydraulic fracturing procedure.

In the oil and gas industry, the gum conveniently is obtained in the form of a powder. The powder also can be suspended conveniently in a non-aqueous fluid, such as diesel, because the gum will not dissolve or swell with a non-aqueous fluid and being suspend in a non-aqueous fluid allows the gum powder to be handled as a liquid.

The oil and gas industry currently uses millions of pounds of gum per year to help build viscosity in aqueous systems, including for use in stimulation procedures such as hydraulic fracturing. The driving factor in selecting a source of gum for use in the oil and gas industry is cost.

Gum is found in certain seeds of Leguminosae, such as the seeds of the guar plant, the carob tree, the honey locust tree, and the flame tree. Among the available agricultural sources of gum, guar seed is one of the most economical.

The guar plant is drought resistant. The guar plant can be grown economically in semiarid regions of the world, such as India and Pakistan, where few other types of crops are viable. The guar plant grows about three to six feet in height and bears many beanlike pods, each which contains six to nine small, rounded guar seeds. In addition to being hardy, typical varieties of guar seed have a relatively high concentration of gum compared to gum-bearing seed from other Leguminosae.

The guar seed is composed of a germ (or embryo), a pair of endosperm sections, and a husk. The germ is brittle and relatively small compared to the endosperm sections. The germ is sandwiched between the pair of endosperm sections but easily separable from the endosperm sections. The endosperm sections contain mostly water-soluble gum (i.e., galactomannan polysaccharide) and minor amounts of proteinaceous material, inorganic salts, water insoluble gum, and cell membranes. The endosperm sections are tough and non-brittle. The endosperm sections are enclosed in the husk, which also is often referred to as the hull. The husk is very tough and very tightly associated with the endosperm sections. Typical varieties of guar seed have about 40%-46% by weight of the germ, about 38%-45% by weight of the endosperm sections (containing the gum), and about 14%-20% of the husk. Unless otherwise stated, all percentages are by weight, and, unless the context otherwise requires, on a dry basis.

However, processing guar seed into gum is mechanically challenging. In particular, it is difficult to separate the gum-containing endosperm sections from the husk selectively.

The conventional process for extracting gum from guar seed includes splitting the seed, which splitting step is often termed "seed processing." In splitting the seed, germ and undehusked guar splits are obtained. The undehusked guar splits are the endosperm sections with the husk still on them. The undehusked guar splits are extremely tough. As part of the splitting step, the brittle, relatively small germ is easily and substantially separated from the relatively large undehusked guar splits by particle size screening.

Next, the undehusked guar splits are processed conventionally in an attempt to separate the endosperm sections and the husk. This is done conventionally by passing the undehusked guar splits through an extruder having an elongated cylindrical barrel provided with an inlet opening, a die opening at the outlet end of the barrel, and a screw rotatable within the barrel to transport and work the undehusked guar splits. This step is sometimes referred to as "dehusking" or "dehulling" the undehusked guar splits. This step produces a product referred to as "dehusked guar splits" and "husk." As part of the dehusking step, the dehusked guar splits and husk are separated by particle size screening.

The "dehusked guar splits" obtained from the conventional dehusking of undehusked guar splits are relatively large, mostly substantially in the form and shape of the endosperm sections, but still having bits of husk still attached to them. Thus, the "dehusked gaur splits" are actually not completely dehusked. Typically, dehusked guar splits comprise about 90% endosperm sections (w/w dry basis) wherein the husk has been substantially but not completely removed. Typically, the dehusked guar splits still contain about 10% husk material.

The "husk" obtained as a by-product from the conventional dehusking of undehusked guar splits is relatively small bits and pieces of husk material of various sizes and shapes. But, in the dehusking step, some of the endosperm material has also been removed with the husk and pieces of the endosperm material have been broken off from the endosperm sections. Thus, the "husk" is not only husk material, but includes bits and pieces of the endosperm sections. Typically, the "husk" comprises about 25-40% endosperm (containing the valuable gum), usually in the form of broken off pieces from the endosperm sections.

For example, after starting with a given amount of typical guar seed, in the splitting step, about 30% by weight is removed as germ. Then in the dehusking step, as much as an additional 37% by weight of the original amount of guar seed is removed as "husk." The husk from the guar seed, however, includes substantial amounts of the endosperm. Typically, the husk comprises in the range of about 25% to about 40% by weight gum, and most typically about 30-35% by weight gum. Thus, the dehusking step removes about 10% to about 30% (typically 25%) by weight of the gum in the original amount of typical guar seed. Nevertheless, because of the difficulty in separation and the relatively low overall concentration of the endosperm material (i.e., gum) contained with the removed husk (i.e., less than about 30%), the husk obtained from conventional guar seed processing has low economic value and is usually considered to be a waste by-product, being typically sold for animal feed.

The dehusked guar splits are then flaked and ground into a powder. The dehusked splits are normally soaked in water from 30 minutes to several hours, at concentrations ranging from 80% to 120% by weight of splits relative to the amount of water, with 100% to 110% being preferred. Flaking is then accomplished by passing the wet dehusked guar splits between two counter rotating rollers, one roller moving substantially faster than the other, thus creating high levels of shear causing the wet splits to shred into moist fibers or flakes. Usually this process imparts such significant mechanical energy that part of the moisture is evaporated and the fiber/flakes heat up several degrees. The flakes are then passed through a hot air grinding or a hammer mill to reduce the flakes to a powder. Hot air is used to transport the flakes into the grinder, as well as to "flash dry cool" the particles during grinding. The temperature, humidity and mixture ratio of the air and flakes are such that the evaporative cooling during grinding offsets the heat generated from grinding so that it prevents the flakes and subsequently the ground powder from exceeding some designated maximum temperature. The powder typically ranges from about 10 microns to about 100 microns in average particle size. The powder is typically less than 10% water by weight and has a very stable and long shelf life. As previously mentioned, the guar gum powder is sometimes suspended in a non-aqueous fluid, such as diesel or environmentally friendly hydrocarbons, for storage and ease of handling.

When desired to be used, the powder is dispersed in water and allowed to hydrate. The viscosity of the solution depends in part on the concentration of the gum, usually in the range of about 0.05% to about 5% by weight of water, where 0.1% to 0.5% by weight of water, is the preferred range.

Despite the challenges in processing the gum from guar seed and the waste, guar gum is still one of the most common means with which to build viscosity in aqueous systems, especially for fracturing fluids (see, for example, U.S. Pat. Nos. 2,891,050 and 3,455,899). In general, it would be commercially valuable to be able to extract more guar gum from guar seeds than conventional processing has allowed, including applications outside the oil and gas industry.

SUMMARY OF THE INVENTION

The invention provides a method for producing guar gum comprising the steps of: (a) sizing husk from guar seed into larger pieces and smaller pieces, (b) washing the larger pieces, (c) soaking the larger pieces, and (d) flaking the larger pieces.

The invention also provides a method for producing guar gum, the method comprising the steps of: (a) dehusking undehusked guar splits to obtain dehusked guar splits and husk, and (b) sizing the husk into larger pieces and smaller pieces.

The invention also provides a method for treating a subterranean formation penetrated by a wellbore, wherein the method comprises the steps of: (a) sizing the husk from guar seed into larger pieces and smaller pieces; (b) washing the larger pieces; (c) soaking the larger pieces; (d) flaking the larger pieces to obtain guar gum flakes; (e) grinding the guar gum flakes to obtain guar gum powder; (f) forming a well treatment fluid, wherein the well treatment fluid comprises an aqueous fluid and the guar gum powder; and (g) introducing the well treatment fluid through the wellbore into the subterranean formation.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

BRIEF DESCRIPTION OF THE DRAWINGS

The accompanying figures are incorporated into and form a part of the specification to illustrate examples of the prior art and the invention. These drawings together with the descriptions serve to explain the principles of the invention. The figures are only for illustrating the prior art and preferred and alternative examples of how the invention can be made and used and are not to be construed as limiting the invention to the illustrated and described examples. The various advantages and features of the invention will be apparent from a consideration of the drawing in which.

DETAILED DESCRIPTION OF THE PREFERRED EMBODIMENTS

Figure 1:
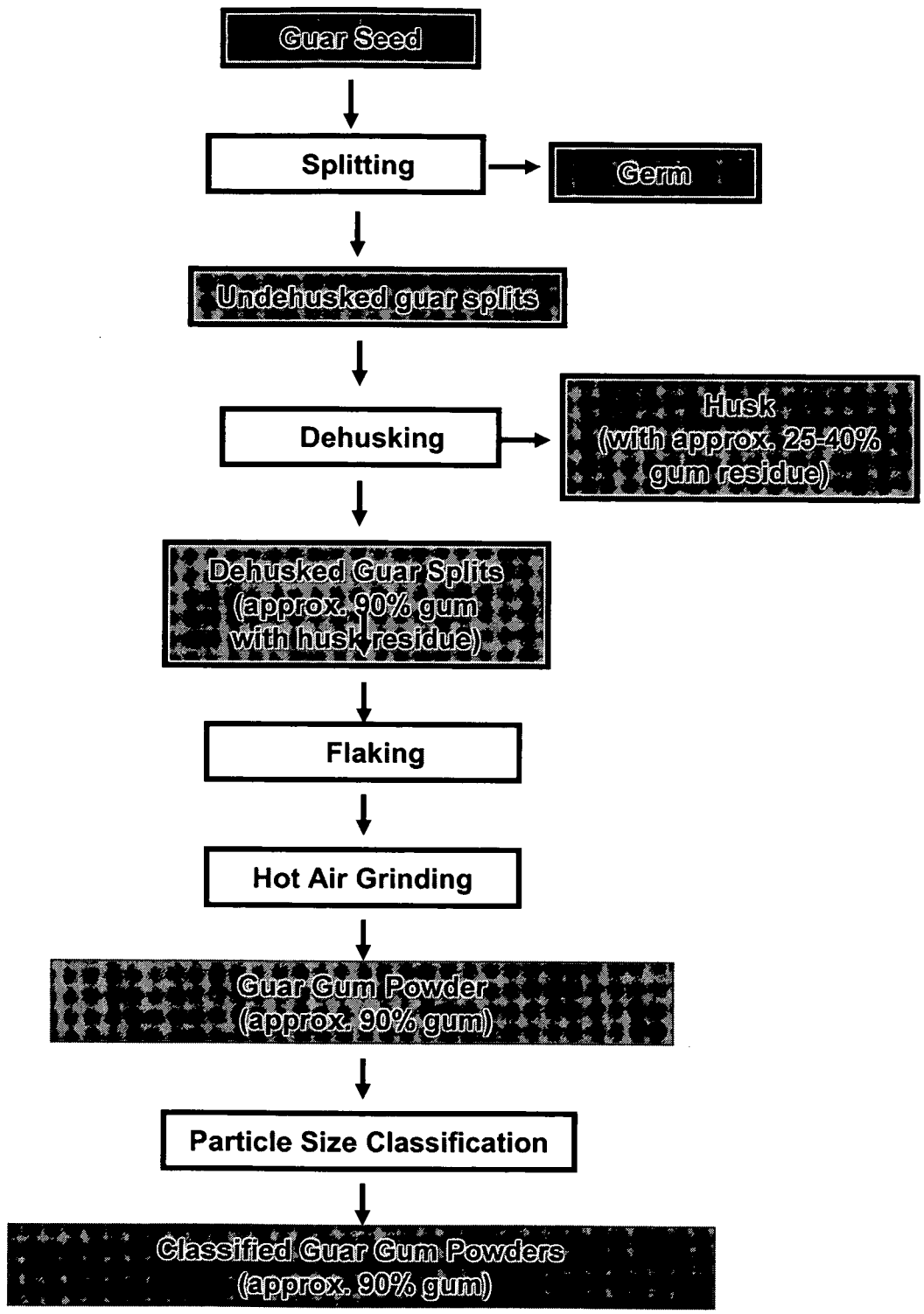
FIG. 1 outlines the prior art for conventionally processing guar seed.

FIG. 1 outlines the conventional processing of guar seeds. The conventional processing includes splitting the guar seed, where the germ is separated from the guar seeds. The relatively small, brittle germ is easily separated from the relatively large undehusked guar splits by screening. Once the germ is removed, what is left is the undehusked guar splits.

Undehusked guar splits are attempted to be dehusked by a heating and abrasion process or via chemical treatments. The heating-abrasion process entails passing the de-germed splits through a heated rotating drum in which steam or direct flames are applied to the external surfaces of the drum. As the undehusked splits travel through the rotating drum, they are heated and become "plastic like", while the thin layer of pericarp (husk skin) dries and shrinks, thus breaking (or partially breaking) its bond with the gum cotyledons. These hot "partially dehusked splits" are transferred to dehusking cylinders where fine toothed blades rotate with carefully controlled clearances from the cylinder walls. As the splits pass through these clearances, the husks are removed, along with fragments of the cotyledons, thus becoming the husk by-product that contains 25 to 40% gum.

A significant amount of the endosperm sections containing the desirable gum is lost in the dehusking step. When the undehusked guar splits are put through the dehusking step to remove the husk from the guar splits, pieces of the endosperm sections are also removed with the husk. These pieces of guar splits that are removed with the husk account for a significant loss of guar gum in guar seed processing, often 25 to 35% of total gum.

The invention provides for a method for producing guar gum by processing the husk by-product from guar seed. By processing husk by-product from guar seed milling, some of the guar-containing endosperm pieces that are lost in a dehusking process can be separated and obtained in higher concentration than otherwise found in the husk. As used herein, the term "husk from guar seed" means husk obtained from a conventional dehusking step or any other process that would produce husk having similar characteristics to the husk produced by a conventional dehusking step. The methods of the invention can reduce procurement and raw material costs of guar gum by advantageously capturing some of the gum that was removed with the husk, providing a higher yield of guar gum from guar seed.

It has been discovered that there is a correlation between the relative size of the pieces of material in the husk and the amount of gum contained in the pieces. More specifically, in the aggregate, the relatively larger pieces include more of the endosperm (gum) than the smaller pieces. As used herein, "larger pieces" is a term used to describe the relatively larger pieces of material obtained by sizing the material of the husk, and "smaller pieces" is a term used to describe the relatively smaller pieces of material obtained by sizing the material of the husk.

For example, for husk obtained from conventional processing of typical guar seed, the husk contained about 38% gum by weight on a dry basis ("w/w dry basis"). If a mesh size of +16 is first used for mechanical particle sizing, the larger pieces from the mechanical sizing typically comprise about 80% gum (w/w dry basis). If a mesh size of 16/+18 is successively used for mechanical particle sizing, the larger pieces from the further mechanical sizing typically comprise about 70% gum (w/w dry basis). If a mesh size of 18/+20 is successively used for mechanical particle sizing, the larger pieces from the further mechanical sizing typically comprise about 45% gum (w/w dry basis). If a mesh size of 20/+25 is successively used, the larger pieces from the further mechanical sizing typically comprise about 20 to 25% gum (w/w dry basis). If a mesh size of 25/+30 is successively used, the larger pieces from the mechanical sizing typically comprise only about 15% gum (w/w dry basis).

The larger pieces having the higher gum concentration would be more economical for further processing to obtain guar gum. Preferably, the larger pieces of husk are sized such that it has at least about 70% gum content. While the gum content of the larger pieces is still lower than that of the dehusked splits mainly comprised of endosperm sections, the gum content is sufficiently high to be useful in various applications. For some applications, the gum content can be sufficiently high to be blended with dehusked guar splits in some proportions without substantially reducing the quality of the resulting guar gum.

In addition, it has been discovered that the smaller pieces of husk can have higher commercial value per unit weight relative to the husk before sizing. For example, the smaller pieces have a relatively higher content of cellulose fiber and protein, which can be useful in fiber products or animal feed. For example, the amount of husks that can be safely used in cattle feed is limited to a given maximum due to the gum content. Therefore, substantially reducing the overall gum content of husks raises the effective protein content and increases the amount allowed in cattle rations.

The invention provides for methods that include the step of sizing the husk to separate the larger pieces from the smaller pieces. The methods can be used to produce various grades of guar gum, in the form of flakes or powder, containing various concentrations of gum, cellulose, ash, protein, and other compounds found in the source guar seed.

Figure 2:
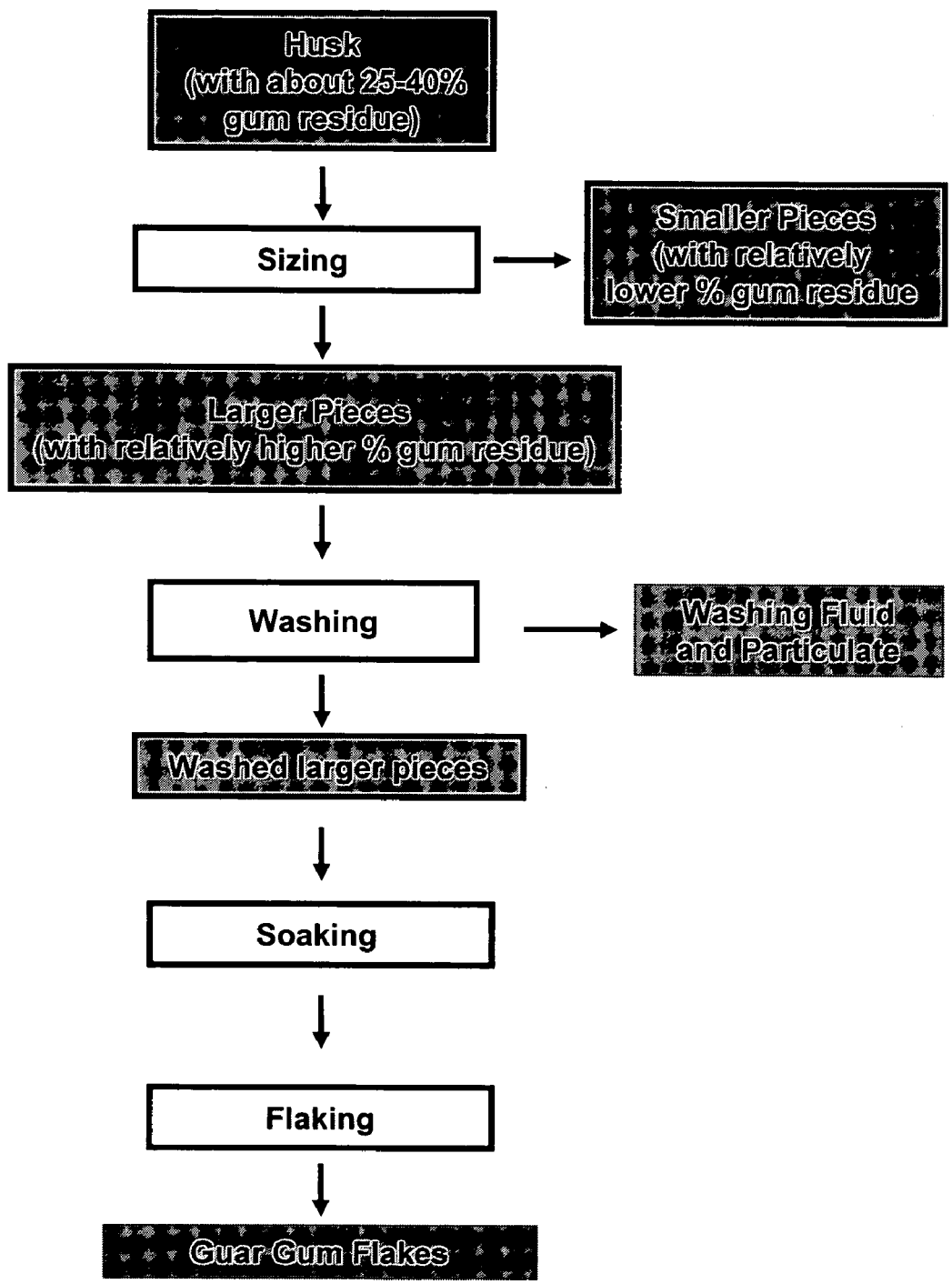
FIG. 2 outlines one embodiment of the invention for producing guar gum, wherein the husk by-product from conventional guar bean splitting is processed to obtain guar gum flakes.
Figure 3:
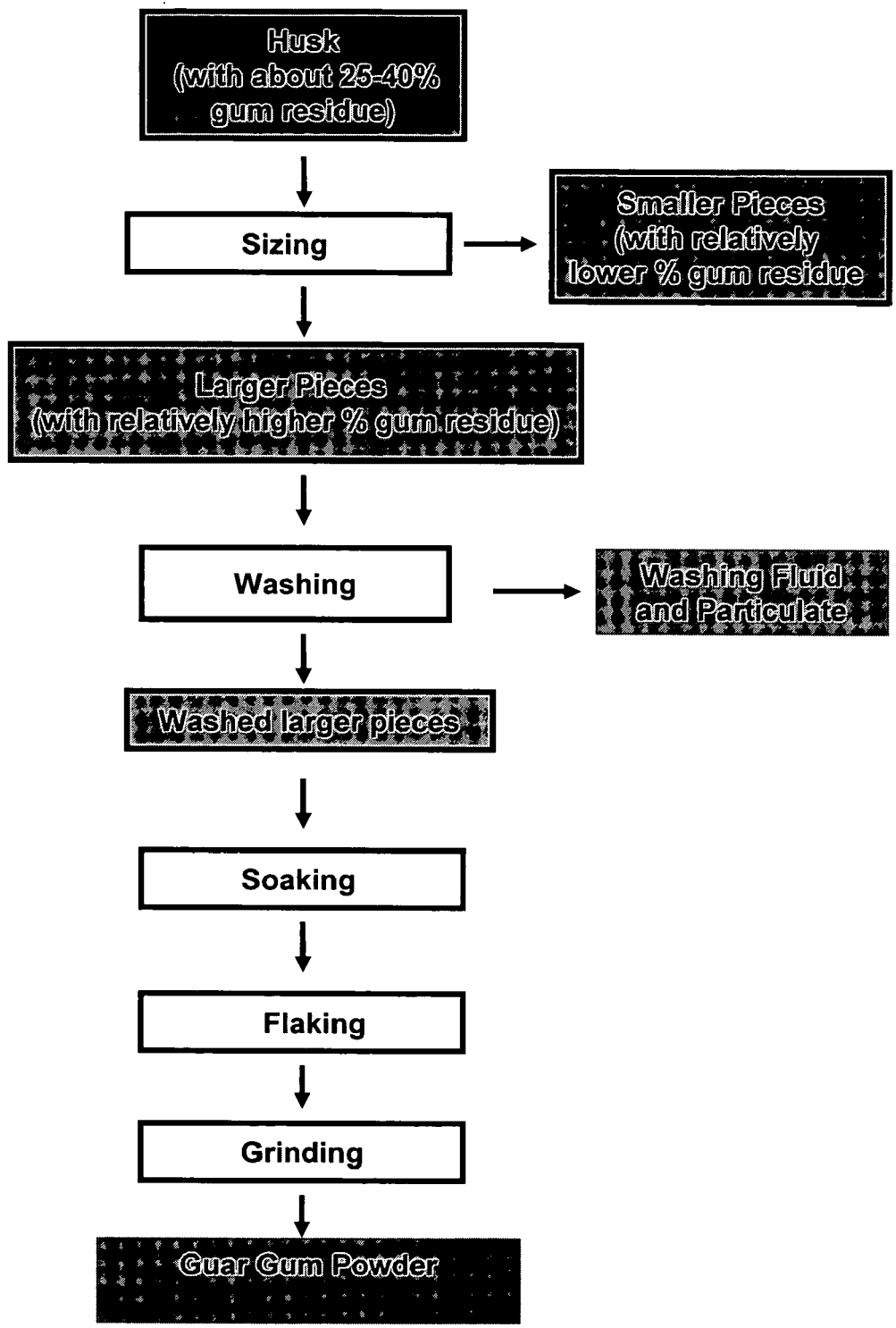
FIG. 3 outlines a preferred embodiment of the invention for producing guar gum, wherein the husk from guar seed is processed to obtain guar gum powder.

FIG. 2 illustrates one embodiment of the invention, which comprises the steps of: (a) sizing the husk into larger pieces and smaller pieces; (b) washing the larger pieces, (c) soaking the larger pieces, and (d) flaking the larger pieces. As can be appreciated by those skilled in the art, preferably several additional steps can be included in the method steps of the invention. For example, as illustrated in FIG. 3, the step of grinding the guar gum flakes to obtain guar gum powder can be included. Further, the invention includes a method for treating a subterranean formation, comprising the steps of: (a) sizing the husk into larger pieces and smaller pieces; (b) washing the larger pieces; (c) soaking the larger pieces; (d) flaking the larger pieces; (e) grinding the flaked larger pieces to obtain guar gum powder; (f) forming a well treatment fluid, wherein the well treatment fluid comprises an aqueous fluid and the guar gum powder; and (g) introducing the well treatment fluid through the wellbore into the subterranean formation.

Preferably, the sizing segregates the husk into larger pieces having a mesh size greater than about 18 and smaller pieces having a mesh size less than about 30. It should be understood that the particle sizing can segregate husk into two or more mesh size ranges. Preferably, the mesh sizes are successively increased to obtain successively smaller sizing cuts of the husk.

The sizing step can be accomplished by any suitable particle sizing equipment. For example, the sizing step can be accomplished by pneumatic particle sizing or conventional vibratory mechanical sieves. In general, pneumatic particle sizing comprises centrifugally sizing the particles in a dry air stream, such as "air classification".

The method of the invention also comprises the step of washing the larger pieces. The purpose of washing is to remove at least some of the fine particulate material from the larger pieces. These small dust size particles prevent the flaking roles from gripping the larger particles and imparting the high shear required to render functional viscosity when hydrated. The step of washing is with a washing solution, which can be any suitable washing fluid. Preferably, the washing fluid is an aqueous solution. As used herein, aqueous means water or a solution containing more than an unsubstantial amount of water.

The fine particles tend to float or be suspended in the aqueous solution and can be washed away from the larger pieces by decanting the excess washing solution. The fine particles suspended in the washing solution also can be removed by screening the washing solution from the larger particles, for example, by using a screen mesh size that is smaller size than 25/+30. Also, agitating during the washing step can be helpful to remove at least some of the fine particulate from the larger pieces.

It is believed that, by washing the fine particulate material from the larger pieces, the larger pieces are more effectively processed. Without being limited by theory, it is believed that, by removing the fine particulate from the larger pieces, the larger pieces have more frictional energy with the flaking rolls during the flaking step where frictional energy is used to rip the soaked and soft larger pieces into shreds of stringy moist material. If fine particulate is not removed from the larger pieces, it is believed that the fine particulate lessen the frictional energy between the pieces and the flaking rolls, by serving as lubricants. By way of analogy, it is believed that the fine particulate act like tiny ball bearings between the surfaces of the flaking rolls and the husk pieces.

The method of the invention also comprises the step of soaking the larger pieces. The soaking step is conducted in an aqueous soaking solution after the larger pieces are washed. As used herein, aqueous means water or a solution containing more than an unsubstantial amount of water. It is believed that soaking in the presence of water hydrates or increases the moisture content in the larger pieces, which is believed to make them easier to flake in the next step. Preferably, the step of soaking comprises soaking the larger pieces under conditions sufficient to hydrate the guar pieces to a moisture content of about 35 to 55% by weight.

Preferably, the soaking solution is made up to be caustic. For example, in a most preferred embodiment, the soaking solution comprises sodium hydroxide, hydrogen chloride, and salts.

The step of soaking can be facilitated by mechanically agitating the larger pieces in the soaking solution to promote mixing of the larger pieces and the soaking solution. The mechanical agitation, for example, can be for periods of 30 minutes to several hours. Mechanical agitation can be accomplished through any means, such as with a ribbon blender.

Figure 4:
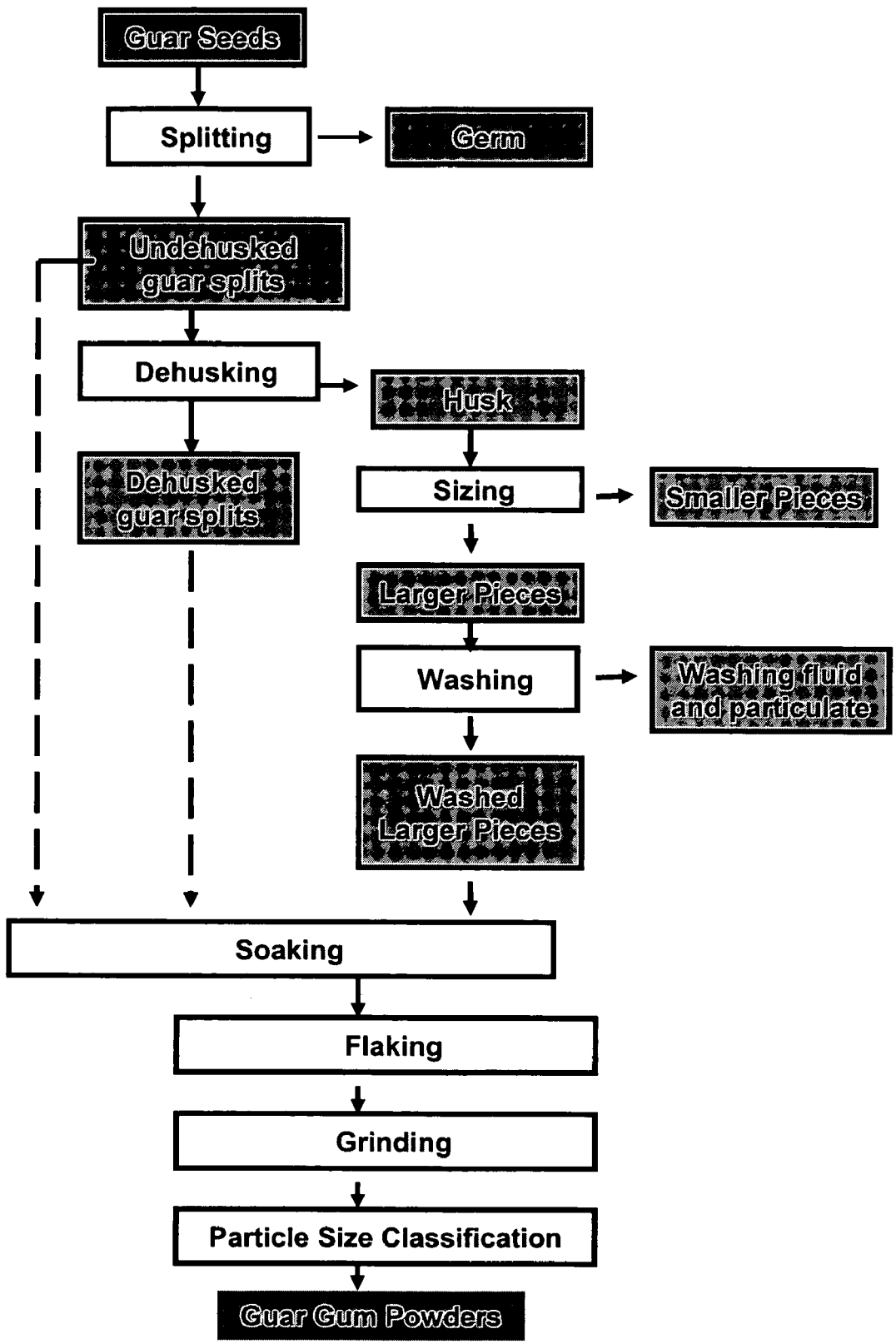
FIG. 4 outlines additional embodiments of the invention for producing guar gum, wherein dehusked guar splits and/or undehusked guar splits can optionally be mixed with larger pieces of size classified husk prior to flaking.

As illustrated in FIG. 4, the method according to the invention optionally further can comprise mixing premium dehusked guar splits with the larger pieces prior to flaking, for example, prior to, during, or after either the washing step of the larger pieces or the soaking step of the larger pieces. As used herein, premium guar splits are those which are produced after conventionally splitting the guar seeds and dehusking the guar splits. Premium guar splits are generally of a larger size compared to the larger pieces of husk. The mixing of premium dehusked guar splits with the larger pieces provides a processing aid for the larger pieces. Without being limited by theory, it is believed that, by mixing premium dehusked guar splits with the larger pieces, the larger pieces are equipped with more frictional energy with the flaking rolls during the flaking step.

When the method includes the step of mixing premium dehusked guar splits with the larger pieces, the method preferably further comprises the step of separately washing the premium dehusked guar splits and the larger pieces prior to mixing them together. Without being limited by theory, it is believed that washing the premium dehusked guar splits and the larger pieces separately is advantageous because of the differing particle size distributions in the premium dehusked guar splits and the larger pieces.

The method of the invention optionally can comprise the step of agriculturally producing the guar seeds. In one preferred embodiment, the method comprises the step of producing guar seeds from Matador guar seeds. Matador is a specific plant variety protected in the United States by Plant Variety Protection Number: 200400235, issued Mar. 23, 2005 to Texas Tech University and Halliburton Energy Services, Inc. The Matador plant variety provides for a higher guar gum yield compared with guar seeds produced from typical varieties of guar plants.

The method optionally can comprise splitting the guar seeds once the guar seeds are produced. Generally, the step of splitting is performed to substantially separate undehusked guar splits from the germ of the guar seeds, as previously explained.

The method optionally can comprise the step of dehusking undehusked guar splits to form dehusked guar splits and husk after the step of splitting.

In one embodiment of the invention, the dehusked guar splits and/or the larger pieces of husk optionally can be transformed into a fine powder, generally with the steps outlined in FIGS. 3 and 4, such as flaking and grinding, which are applied to produce a dry stable powder that can be useful in subterranean formations. As previously mentioned, in the flaking step, the dehusked guar splits and/or the larger pieces are passed through high speed flaking (flattening) rolls, where frictional energy is used to rip the soaked and softened larger pieces into shreds of stringy moist material that is then ground to a powder. The grinding of the powder can be, for example, in a hot air hammer or pin mill, also referred to as hot air grinding. In the hot air grinding operation, the moisture content from the previous soaking helps to control the maximum temperature of the guar gum, which reduces the risk to the guar gum from heat degradation. This is accomplished through evaporative cooling of the particles as the excess moisture "flashes" to vapor during the grinding and/or transporting process steps. The grinding step transforms the flaked larger pieces into a fine powder, normally ranging from 10 microns to 100 microns in average particle sizes. The larger pieces are ground in hot air to form gum powder, which is dry and stable for a long shelf life. If desired, the gum powder can be suspended in a non-aqueous solution, such as diesel or an "environmentally compatible hydrocarbon", to carry the guar gum powder as a more-easily-handled liquid.

Additional steps can be used optionally to further process the powder of the guar gum, such as the particle size classification step, also known as the air classification or screening operation. Particle size classification can be accomplished by any particle sizing instrument. The particle size classification step is used to at least partially separate cellulose particles from gum particles. Alternatively, the cellulose particles are not separated from the gum particles.

Other steps can be added to the method of the invention to further process the larger pieces to be used directly in fracturing oil or gas wells.

As mentioned previously, the step of soaking can comprise mixing premium dehusked guar splits with the larger pieces during the washing or soaking step. The combination of premium dehusked guar splits and larger pieces provide a processing aid for the larger pieces. Preferably, the premium dehusked guar splits have been cleaned prior to mixing them with the larger pieces.

FIG. 4 outlines how both premium dehusked guar splits as well as undehusked guar splits can be added and mixed with the larger pieces during either the washing or the soaking step, but prior to the step of flaking the larger pieces. For example, the premium dehusked guar splits can be mixed with the washed larger pieces; then the mix of the premium dehusked guar splits and washed larger pieces is soaked.

The soaked mixture of premium dehusked guar splits and washed larger pieces is then passed through the flaking step to rip the mix of premium dehusked guar splits and larger pieces mix into shreds of moist material. The shreds can be ground into powder, for example, by hot air grinding. In hot air grinding, the moisture content from the soaking step helps control the maximum temperature of the guar gum.

Hydration can be accomplished by pouring the water on the seed part or adding the seed part directly to the water. Preferably, the soaking step further includes agitating the aqueous solution to promote mixing and hydration. Another method of hydrating involves spraying the agitated seed part with a fine mist using an air pressure controlled atomizer. For example, the guar parts (undehusked splits or dehusked splits or whole beans) can be hydrated prior to flaking to a total moisture content ranging 35% to 65%; the preferred amount being 50% by weight.

The method of the invention can comprise the further step of forming a well treatment fluid, wherein the well treatment fluid comprises an aqueous fluid and the powdered guar gum. The aqueous fluid, for example, can be fresh water, natural brines, and/or artificial brines. The artificial brines, for example, can be selected from the group consisting of potassium chloride solutions and sodium chloride solutions. Depending on the application, the well treatment fluid can include a variety of materials. For example, the well treatment fluid can include a proppant, a crosslinker, a breaker, etc. The well treatment fluid also can include a stabilizer, a delaying agent, etc.

The method can comprise the further step of introducing the well treatment fluid into the subterranean formation through the wellbore. In fracturing applications, the well treatment fluid can be introduced at a pressure sufficient to create at least one fracture in the formation. The method further can include the step of producing hydrocarbon from the wellbore.

Possible applications that can benefit from the inventive methods and compositions include not only applications of subterranean formations penetrated by a wellbore, but also a broad range of industrial applications. Such industries include, but are not limited to, foods, textiles, explosives, stimulation procedures in the oil and gas industry, cosmetics, foods/pharmacy, paper, explosives, water treatment, mining petroleum, and paints.

Figure 5:
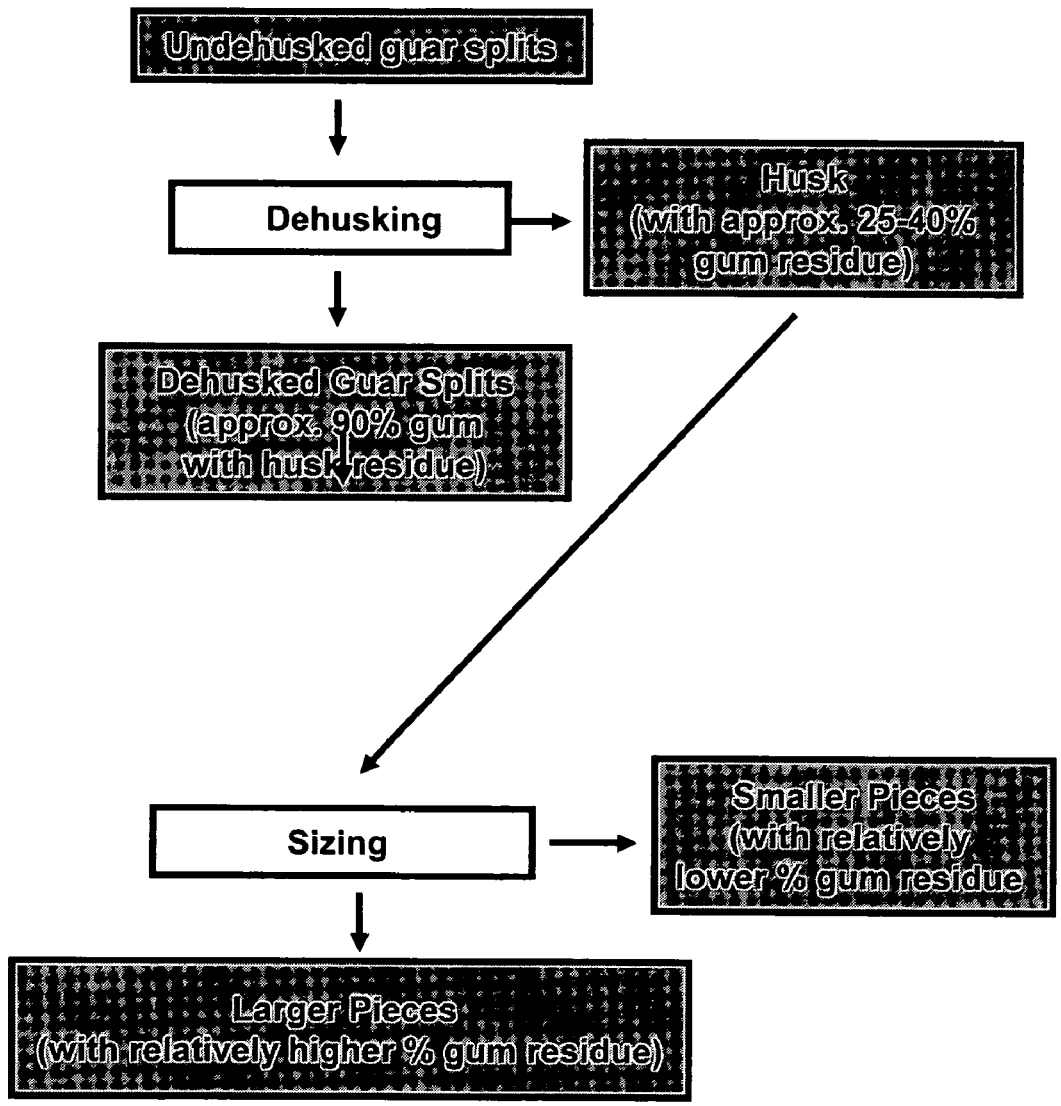
FIG. 5 outlines another embodiment of the invention for producing guar gum, including the steps of: (a) dehusking undehusked guar splits to obtain dehusked guar splits and husk, and (b) sizing the husk into larger pieces and smaller pieces.

Referring to FIG. 5, another embodiment of the invention for producing guar gum is illustrated, including the steps of: (a) dehusking undehusked guar splits to obtain dehusked guar splits and husk, and (b) sizing the husk into larger pieces and smaller pieces. As previously discussed, additional optional and desirable steps can be included in the method to obtain desirable guar gum products and the other by-products of the process also can have increased commercial value.

It can be appreciated in the art that a number of variations can be affected in soaking, flaking, and grinding steps in accordance with the process described above without materially departing from the scope and spirit of the invention. Thus, the method of the invention can include additional steps that are not illustrated in FIGS. 2, 3, 4, or 5. Such variations will be apparent to those skilled in the art and are to be included within the scope of this invention. For example, it should be understood by those skilled in the art that the method also can comprise the step of hydrating any whole seed or part thereof, including the guar splits, husk, or larger pieces, at any point in the process to provide a desired moisture content.

After careful consideration of the specific and exemplary embodiments of the present invention described herein, a person of ordinary skill in the art will appreciate that certain modifications, substitutions, and other changes can be made without substantially deviating from the principles of the present invention. The detailed description is illustrative, the scope and spirit of the invention being limited only by the appended claims.

What is claimed is:

1. A method for producing guar gum, the method comprising the steps of:
  a. dehusking undehusked guar splits to obtain dehusked guar splits and husk; and then
  b. sizing the husk
  c. washing the larger pieces; and then
  d. soaking the larger pieces; and then
  e. flaking the larger pieces.

2. The method according to claim 1, wherein the larger pieces comprise relatively more gum content than the husk before sizing, and the smaller pieces comprise relatively less gum content than the husk before sizing.

3. The method according to claim 2, wherein the larger pieces are sized to have greater than 40% gum content by weight.

4. The method according to claim 1, wherein the step of sizing comprises sizing using a screen.

5. The method according to claim 1, wherein the step of sizing comprises pneumatic particle sizing.

6. The method according to claim 5, wherein the step of pneumatic particle sizing comprises centrifugally sizing the particles in a wet environment.

7. The method according to claim 1, wherein the step of washing is with an aqueous washing solution.

8. The method according to claim 6, wherein the step of washing the larger pieces further comprises using a screen to separate the aqueous washing solution and fine particulate from the larger pieces.

9. The method according to claim 1, wherein the step of soaking comprises soaking the larger pieces with an aqueous soaking solution under conditions sufficient to hydrate the larger pieces to a moisture content of about 50% by weight.

10. The method according to claim 9, wherein the aqueous soaking solution is caustic.

11. The method according to claim 1, further comprising the step of mixing dehusked guar splits and the larger pieces in any proportion prior to the step of flaking.

12. The method according to claim 1, further comprising the step of: prior to the step of dehusking undehusked guar splits, splitting guar seed to obtain undehusked guar splits and germ.

13. The method according to claim 1, further comprising the step of grinding the flakes to obtain guar gum powder.

14. The method according to claim 13, wherein the step of grinding comprises hot air grinding.

15. The method according to claim 13, further comprising the step of particle size classifying the guar gum powder to obtain classified guar gum powders.

16. The method according to claim 13, further comprising the step of forming a well treatment fluid, wherein the well treatment fluid comprises an aqueous fluid and the guar gum powder.

17. The method according to claim 16, further comprising the step introducing the well treatment fluid into the subterranean formation through the wellbore.

18. The method according to claim 17, wherein introducing the well treatment fluid further comprises introducing the well treatment fluid at a pressure sufficient to create at least one fracture in the formation.

19. The method according to claim 17, further comprising the step of producing hydrocarbon from the wellbore.

20. A method for treating a subterranean formation penetrated by a wellbore, wherein the method comprises the steps of:
  a. dehusking undehusked guar splits to obtain dehusked guar splits and husk; and then
  b. sizing the husk
  c. washing the larger pieces; and then
  d. soaking the larger pieces; and then
  e. flaking the larger pieces to obtain guar gum flakes; and then
  f. grinding the guar gum flakes to obtain guar gum powder; and then
  g. forming a well treatment fluid, wherein the well treatment fluid comprises an aqueous fluid and the guar gum powder; and then
  h. introducing the well treatment fluid through the wellbore into the subterranean formation.

21. The method according to claim 20, further comprising the steps of: prior to the step of dehusking,
  a. splitting guar seed to obtain undehusked guar splits and germ.

22. The method according to claim 1, wherein the husk obtained from dehusking undehusked guar splits contains from about 25% to about 40% by weight endosperm.

23. The method according to claim 20, wherein the husk obtained from dehusking undehusked guar splits contains from about 25% to about 40% by weight endosperm.

* * * * *